(12) United States Patent
Wang et al.

(10) Patent No.: US 7,601,330 B2
(45) Date of Patent: Oct. 13, 2009

(54) PROCESS FOR PRODUCING BINDER-FREE ZSM-5 ZEOLITE IN SMALL CRYSTAL SIZE

(75) Inventors: Deju Wang, Shanghai (CN); Zhongneng Liu, Shanghai (CN); Jiang Zhao, Shanghai (CN); Xinghua Jiang, Shanghai (CN)

(73) Assignees: China Petroleum & Chemical Corporation, Beijing (CN); Shanghai Research Institute of Petroleum Technology SINOPEC, Shanghai (CN)

( * ) Notice: Subject to any disclaimer, the term of this patent is extended or adjusted under 35 U.S.C. 154(b) by 0 days.

(21) Appl. No.: 11/503,143

(22) Filed: Aug. 14, 2006

(65) Prior Publication Data

US 2007/0042900 A1  Feb. 22, 2007

(30) Foreign Application Priority Data

Aug. 15, 2005   (CN) .................. 2005 1 0028782

(51) Int. Cl.
*C01B 39/00* (2006.01)
*B01J 21/00* (2006.01)
(52) U.S. Cl. .............. 423/705; 423/709; 423/712; 423/716; 423/708; 502/77
(58) Field of Classification Search ............ 502/77; 423/705, 708, 709, 712, 716
See application file for complete search history.

(56) References Cited

U.S. PATENT DOCUMENTS

| | | | | |
|---|---|---|---|---|
| 4,022,715 A | * | 5/1977 | Bornfriend | 502/439 |
| 5,460,796 A | * | 10/1995 | Verduijn | 423/700 |
| 5,665,325 A | | 9/1997 | Verduijn | |
| 6,458,736 B2 | | 10/2002 | Mohr et al. | |

FOREIGN PATENT DOCUMENTS

CN   1037415 C   2/1998

OTHER PUBLICATIONS

Wang et al. "Zeolitization of diatomite to prepare hierarchical porous zeolite materials through vapor-phase transport process." Journal of Materials Chemistry, 2002, 12, 1812-1818.*

(Continued)

*Primary Examiner*—Kevin P Kerns
*Assistant Examiner*—John A Hevey
(74) *Attorney, Agent, or Firm*—Birch, Stewart, Kolasch & Birch, LLP

(57) ABSTRACT

The present invention relates to a process for producing a binder-free ZSM-5 zeolite in small crystal size. The invention is primarily used for solving the problems in the practical application, e.g., the zeolite powder is difficult to be recovered and easily inactivates and aggregates, and the addition of the binder in the shaping process will result in the reduction of effective surface areas and introduce the diffusional limitation. Said problems are better solved in the present invention by using diatomite or silica aerogel as the main starting material, adding a seed crystal orienting agent, a silica sol and sodium silicate for kneading and shaping, and then converting to integrative ZSM-5 in small crystal size by vapor-solid phase crystallization with organic amine and water vapor. Said process can be used in the industrial preparation of ZSM-5 molecular sieve catalyst in small crystal size.

4 Claims, 2 Drawing Sheets

OTHER PUBLICATIONS

Zeolitization of diatomite to prepare hierarchical porous zeolite materials through a vapor-phase transport process, Yajun Wang et al, Laboratory of Molecular Catalysis and Innovative Materials, Dept. of Chemistry, Fudon University, Shanghai 200433, PR China, J. Mater. Chem., 2002, 1812, pp. 1812-1818.

Zeolites and Mesoporous Materials at the Dawn of the 21st Century, 21-P-07 "The Zeolitisation of diatoms to create hierarchical pore structures," S.M. Holmes et al., 2001, Studies in Surface Science and Catalysis, vol. 135, pp. 296. (8 pages).

* cited by examiner

PROCESS FOR PRODUCING BINDER-FREE ZSM-5 ZEOLITE IN SMALL CRYSTAL SIZE

TECHNICAL FIELD

The present invention concerns a process for producing a binder-free ZSM-5 zeolite in small crystal size.

BACKGROUND OF THE INVENTION

Zeolite molecular sieves are widely used in the catalyst field due to their homogeneous and ordered micropores, great specific surface and high hydrothermal stability. Zeolites in small crystal size have short intragranular diffusion pore channels and great external surface, which are advantageous to increasing the opportunities of contacting the reactants with the active sites in micropores, so as to improve the properties of zeolites. Said zeolites show their unique advantages in the reaction, such as particular macromolecular selectivity, relatively higher catalytic activity, longer catalytic lifetime and the like. However, the size of zeolites is too small to be convenient in the practical application. Moreover, such zeolites are difficult to be recovered, easily inactivate and aggregate. The addition of the binder is necessary in the shaping process, which results in the reduction of effective surface areas and introduces the diffusional limitation. Binder-free zeolite molecular sieves are zeolite particles containing no inert binders or a small amount of inert binders and having a higher zeolite content. Therefore, they may have much effective surface area and better catalytic property.

Diatomite is an aluminosilicate-enriched mineral substance. Anderson disclosed that, by secondary growth method, diatomite supported in the zeolite seed crystal grew by the action of the external silica source and alumina source, and thereby a zeolite film was formed on the surface of diatomite [S. M. Holmes et al. *Stud. Surf. Sci. Catal.*, 2001, 135, 296.]. On the premise of retaining the characteristic multilevel-pore structure of diatomite, Wang carried out the crystal transition of diatomite to the zeolite materials having a multilevel-pore structure [Y. J. Wang et al. *J. Mater. Chem.*, 2002, 12, 1812.].

Due to peculiar pore channel structure and better catalytic property, ZSM-5 molecular sieve becomes a very important shape selective catalytic material, and is widely applied in the organically catalytic conversion The binder conversion process is one of those for the preparation of binder-free zeolite molecular sieves. Long Yincai discloses the preparation of a binder-free ZSM-5 type hydrophobic silicon zeolite by mixing a ZSM-5 type hydrophobic silicon zeolite powder with a binder containing silicon oxide, shaping the mixture and drying, and then crystallizing and calcining the mixture in an organic amine or quaternary ammonium aqueous solution, or in a vapor [Long. Y C, Binder-Free Hydrophobic Silicon Zeolite Adsorbent and Preparation thereof, Patent No:ZL 94112035.X]. U.S. Pat. Nos. 5,665,325 and 6,458,736 disclose a process for producing binder-free MFI zeolites, and the use thereof in the hydrocarbon catalytic reaction. Said process comprises preparing MFI zeolite powder first and shaping with an amorphous silicon oxide, and converting the shaped product to MFI in small crystal size by hydrothermal crystallization, wherein zeolite phases newly formed grew around the initial zeolite molecular sieves in large crystal size, and were interwoven together. In said process, the initial powder of zeolites needs to be prepared first, mixed with the binder for shaping, and then subject to the crystallization treatment. Diatomite, carbon white or mixtures thereof as the primary materials are kneaded together with the seed crystal orienting agent and a suitable amount of silica sol or water glass, and shaped. Then, the shaped product is converted to integrative ZSM-5 binder-free shaped zeolite in small crystal size. By this process, the silica and alumina materials may be conveniently and simply converted to ZSM-5 binder-free shaped zeolite in small crystal size. The process of the present invention may be developed into an economical process for producing zeolite molecular sieve catalytic materials. Moreover, integrative ZSM-5 binder-free shaped zeolite in small crystal size has more macroporous structures, and can have synergistic effects in the practical catalytic reaction with micropores in the zeolite crystals. For example, micropores are used as the reaction place, and macropores are used as the transportation channel of the reactant molecules, so as to eliminate the diffusional limitation and effectively utilize zeolites.

SUMMARY OF THE INVENTION

In the disclosure of ZSM-5 binder-free shaped zeolites in the prior art, a great deal of zeolite initial powder needs to be incorporated for the preparation of the the precursors. Therefore, there may be some problems, e.g., the preparation process is complex; pollutants such as waste water may be produced by hydrothermal crystallization; the zeolites produced may have large crystal size and may be limited in some applications. In order to solve said problems in the prior art, a novel process for producing ZSM-5 zeolites in small crystal size is provided. Said process has a simple preparation procedure, produces no waste, uses materials which are easily available, and has a zeolite particle size controlled within the scope of the submicron level. Moreover, said preparation process maybe used to, by a one-off way, convert the starting materials to binder-free ZSM-5 zeolites in small crystal size, and the product thereof has the advantage of containing no inert binders.

To solve the aforesaid technical problems, the following technical solution is used in the present invention. A process for producing ZSM-5 zeolites in small crystal size comprises using diatomite or carbon white as a silica source, and oxides of aluminium, aluminium salts or aluminates as aluminum source material, adding a seed crystal orienting agent, an extrusion aid together with a silica sol or water glass in a desired amount for kneading and shaping to obtain a precursor mixture having a weight ratio of X $Na_2O$:Y $Al_2O_3$:100 $SiO_2$ in which X is from 0 to 16, and Y is from 0 to 6, then converting to binder-free ZSM-5 shaped zeolites in small crystal size by vapor-solid phase crystallization with organic amine and water vapor, wherein the crystallization is conducted at 120-200° C. for 48-240 hours, wherein said seed crystal orienting agent is obtained by aging the mixture having a molar ratio of $(TPA)_2O$:2-10 $SiO_2$:60-150 $H_2O$ at 50-100° C. for 12-240 hours, wherein TPA represents tetrapropylammonium.

In the technical solution stated above, the seed crystal orienting agent therein is preferably a colloidal liquid containing nano ZSM-5 zeolites or ZSM-5 primary structure, and is added in an amount of 1.0-50 wt % of the precursor mixture. The organic amine therein is preferably at least one selected from the group consisting of ethylamine, n-propylamine, n-butylamine, ethylenediamine, triethylamine and hexanediamine. The vapor-solid phase crystallization therein is conducted preferably at 140-180° C., and lasts 72-180 hours preferably. The ZSM-5 zeolite in small crystal size therein has a particle size of preferably less than 1 μm. In addition, the extrusion aid therein is preferably at least one selected from the group consisting of sesbania powder, starch, activated carbon, polyethylene glycol, polyacrylamide and polyvinyl alcohol, and is preferably in an amount of 0.1-4 wt % of the precursor mixture.

Because the self-made seed crystal orienting agent is added to the kneading and shaping process of the reaction materials, and the seed crystal orienting agent prepared in the present invention contains a great amount of ZSM-5 primary and secondary structural units, the seed crystal orienting agent may be homogeneously distributed in the shaped materials during the kneading and shaping process. In the vapor-solid phase crystallization, said ZSM-5 primary and secondary structural units become the crystal nucleus of the ZSM-5 zeolites for crystallization. Although the seed crystal orienting agent is in a small amount, it has an important function of inducing the growth of silica alumina materials on the surface thereof, avoiding the nucleation growth period, speeding up the conversion, shortening the crystallization time, inhibiting the production of stray crystals, decreasing the particle size of the crystals. Moreover, since the zeolite crystals growing around the crystal nucleus may be interwoven due to the space limitation, the seed crystal orienting agent may improve the strength of the resulting integrative binder-free ZSM-5 zeolites, so as to be advantageous to the practical application and to achieve better technical effects.

DESCRIPTION OF THE DRAWINGS

FIG. 1 shows that the product in Example 3 is the ZSM-5 zeolite.

FIG. 2 shows that the ZSM-5 zeolite has a crystal size of about 200 nm.

FIG. 3 shows that, in the product, the starting materials, i.e., diatomite, carbon white and the binder-silica sol are converted to the ZSM-5 zeolite particles having a particle size of 100-500 nm, and said zeolite particles are interwoven with each other The following examples further illustrate the invention.

EXAMPLES

Example 1

Figure 1:
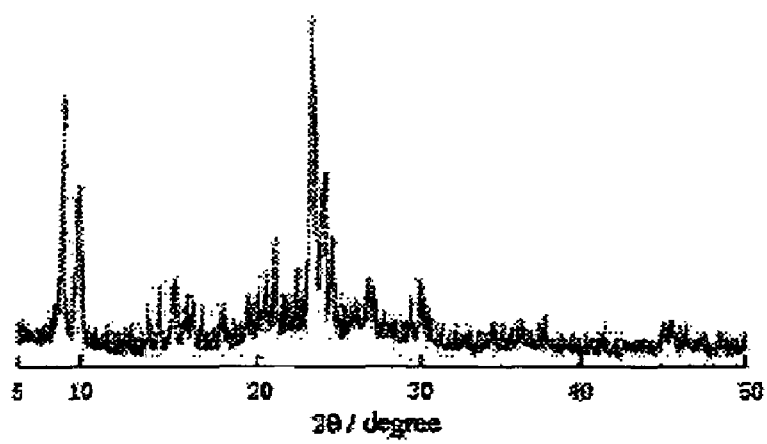
FIG. 1 represents the XRD spectrogram of the product in Example 3.
Figure 2:
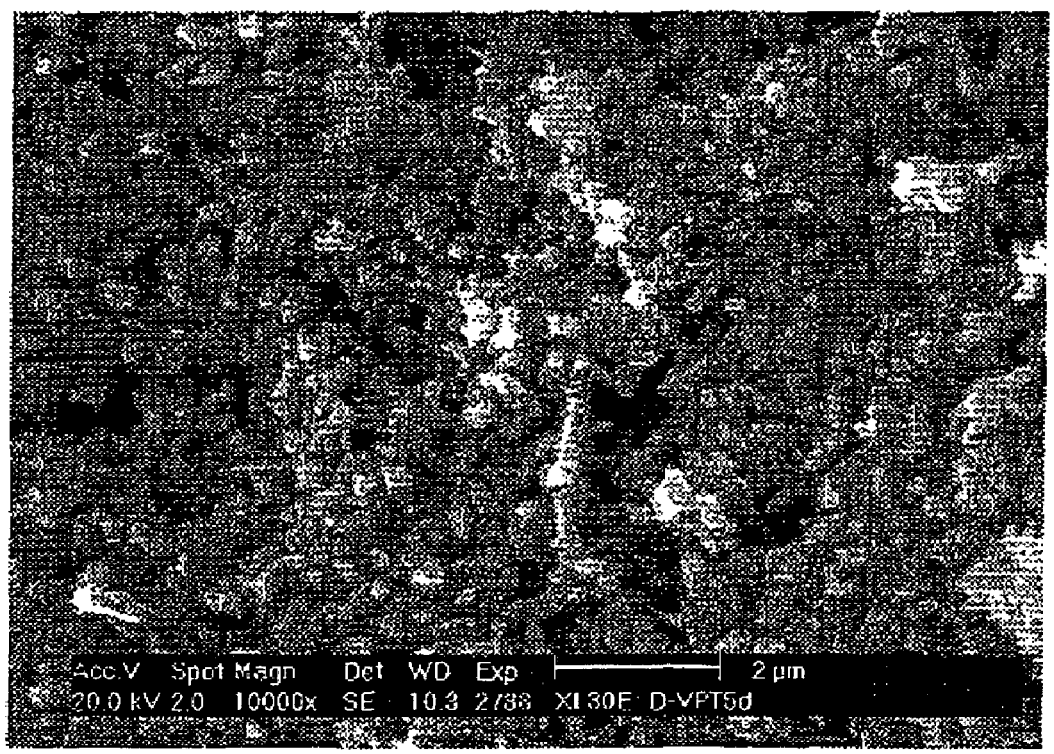
FIG. 2 represents the SEM photograph of the surface layer of the product in Example 3.
Figure 3:
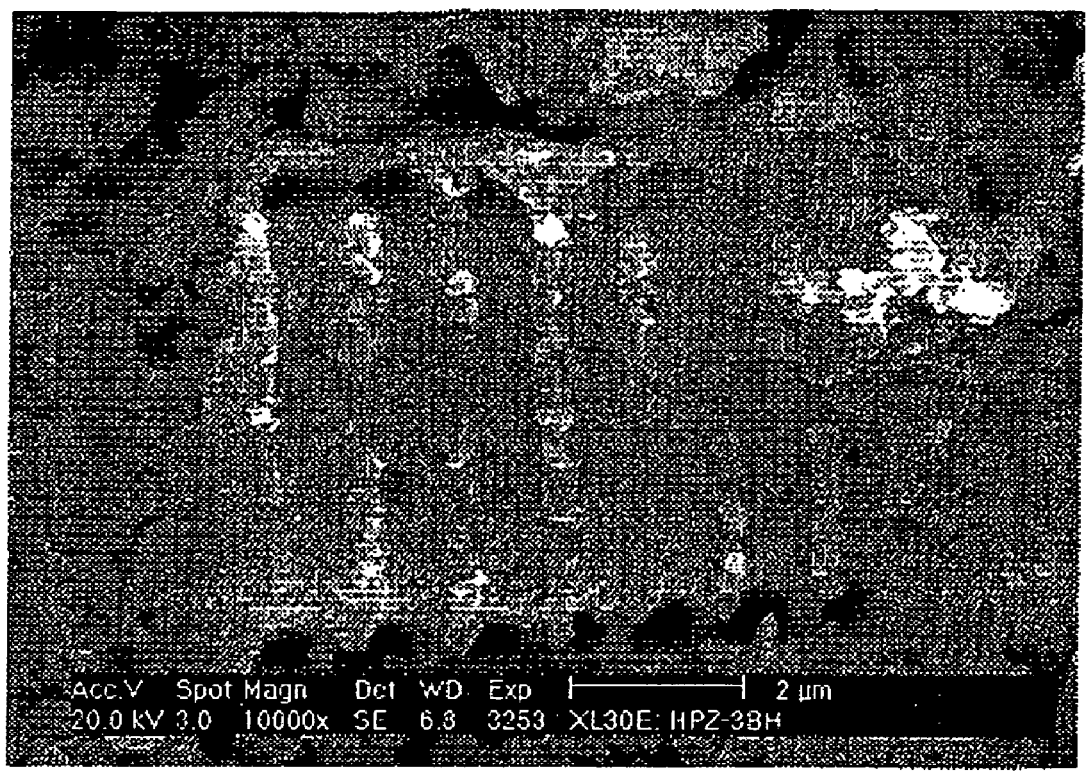
FIG. 3 represents the SEM photograph of the product in Example 6.

A mixture of tetrapropylammonium hydroxide (TPAOH) solution, tetraethyl orthosilicate (TEOS) and water in a molar ratio of $(TPA)_2O:5.5\ TEOS:90\ H_2O$ was stirred homogeneously. After the three-day aging and refluxing at 80° C., a seed crystal orienting agent was then obtained.

Examples 2-4

20 g of a the seed crystal orienting agent prepared in Example 1 and 15 g of a silica sol (40 wt %) were added to 300 g of diatomite (having a composition of 87.74 wt % of $SiO_2$, 1.44 wt % of Al, 0.18 wt % of Ca, 0.80 wt % of Fe, 0.24 wt % of K, 0.30 wt % of Mg and 0.09 wt % of Na). Then, 120 g of water was added therein to knead the mixture into a cylindrical shape.

The reaction vessel was pre-added with a mixture of 5 g of triethylamine, 10 g of ethylenediamine and 15 g of distilled water. 30 g of the cylindrical product prepared above was placed above a stainless steel screen in the reaction vessel. After sealing of the reaction vessel, the vapor-solid phase treatment was conducted at 180° C. for 3, 5 and 7 days. The resulting product was removed, washed with distilled water and dried, and then calcined in air at 550° C. The XRD spectrogram of the product after 3-day treatment showed that ZSM-5 zeolite crystals had been produced. The crystallinity of the product after 5-day treatment was greatly increased, and diatomite had been completely converted. The SEM photographs of the surface layer of the shaped zeolite showed that ZSM-5 zeolite crystals had a width of about 200 nm, while the SEM photographs of the cross section thereof showed that ZSM-5 zeolite crystals had a width of about 200-500 nm and the surface area of 225 $m^2/g$ as determined by nitrogen adsorption at low temperatures. After 7-day treatment, the crystallinity of the product did not increase any more.

Examples 5-7

7.5 g of sesbania-powder and aluminum sulfate solution [formed by dissolving 20 g of $Al_2(SO_4)_3 \cdot 18H_2O$ in 50 g of water] and 33 g of the seed crystal orienting agent prepared in Example 1 were added to a mixture of 80 g of diatomite and 120 g of silica aerogel. Then, 225 g of silica sol (40 wt %) was added therein to knead the mixture into a cylindrical shape.

The reaction vessel was pre-added with a mixture of 10 g of triethylamine, 12.5 g of ethylenediamine and 8 g of distilled water. 50 g of the cylindrical product prepared above was placed above a stainless steel screen in the reaction vessel. After sealing of the reaction vessel, the vapor-solid phase treatment was conducted at 180° C. for 3, 5 and 7 days. The resulting product was removed, washed with distilled water and dried, and then calcined in air at 550° C. The X spectrogram showed that the products all were ZSM-5 zeolites, and the shaped zeolites had a crystal size of less than 500 nm.

Examples 8-11

10 g of sesbania powder and aluminum sulfate solution [formed by dissolving 27.8 g of $Al_2(SO_4)_3 \cdot 18H_2O$ in 50 g of water] and 40 g of the seed crystal orienting agent prepared in Example 1 were added to 250 g of silica aerogel. Then, 470 g of silica sol (40 wt %) was added therein to knead the mixture into a shape.

The reaction vessel was pre-added with a mixture of 5 g of triethylamine, 7 g of ethylenediamine and 10.5 g of distilled water. 50 g of the cylindrical product prepared above was placed above a stainless steel screen in the reaction vessel. After sealing of the reaction vessel, the vapor-solid phase treatment was conducted at 180° C. for 2, 3, 5 and 7 days. The resulting product was removed, washed with distilled water and dried, and then calcined in air at 550° C. The XRD spectrogram showed that the products all were ZSM-5 zeolites, and the shaped zeolites had a crystal size of less than 600 nm.

Example 12

A mixture of tetrapropylammonium bromide (TPABr) solution and silica sol with a molar composition of $(TPA)_2O:4\ SiO_2:100\ H_2O$ was stirred for 24 hours at room temperature. The pH thereof was adjusted to 12 with ammonia water. The mixture was then aged at 60° C. for 140 hours, so as to form a seed crystal orienting agent.

Examples 13-15

12 g of sesbania powder and aluminum sulfate solution [formed by dissolving 27.8 g of $Al_2(SO_4)_3 \cdot 18H_2O$ in 50 g of water] and 80 g of the seed crystal orienting agent prepared in Example 12 were added to 250 g of silica aerogel. Then, 400 g of silica sol (40 wt %) was added therein to knead the mixture into a cylindrical shape.

The reaction vessel was pre-added with a mixture of 8 g of triethylamine, 7 g of ethylenediamine and 8 g of distilled water. 50 g of the cylindrical product prepared above was placed above a stainless steel screen in the reaction vessel. After sealing of the reaction vessel, the vapor-solid phase treatment was conducted at 200° C. for 4, 6 and 9 days. The resulting product was removed, washed with distilled water and dried, and then calcined in air at 550° C. The XRD spectrogram showed that the products all were ZSM-5 zeolites, and the shaped zeolites had a crystal size of less than 800 nm.

Examples 16-17

8.0 g of sesbania powder and aluminum sulfate solution [formed by dissolving 18 g of $Al_2(SO_4)_3 \cdot 18H_2O$ in 50 g of water] and 40 g of the seed crystal orienting agent prepared in Example 1 were added to 80 g of diatomite and 120 g of silica aerogel carbon white. Then, 220 g of silica sol (40 wt %) was added therein to knead the mixture into a shape.

The reaction vessel was pre-added with a mixture of 8 g of triethylamine and 7 g of distilled water. 50 g of the cylindrical product prepared above was placed above a stainless steel screen in the reaction vessel. After sealing of the reaction vessel, the vapor-solid phase treatment was conducted at 160° C. for 4 and 6 days. The resulting product was removed, washed with distilled water and dried, and then calcined in air at 550° C. The XRD spectrogram showed that the products all were ZSM-5 zeolites, and the shaped zeolites had a crystal size of less than 500 nm.

Examples 18-19

10 g of sesbania powder and sodium aluminate solution [formed by dissolving 39.1 g of $NaAlO_2$ ($Al_2O_3$ being in an amount of higher than 43 wt %) in 80 g of water] and 40 g of the seed crystal orienting agent prepared in Example 1 were added to 180 g of silica aerogel. Then, 275 g of silica sol (40 wt %) was added therein to knead the mixture into a shape.

The reaction vessel was pre-added with a mixture of 35 g of ethylenediamine and 5 g of distilled water. 150 g of the cylindrical product prepared above was placed above a stainless steel screen in the reaction vessel. After sealing of the reaction vessel, the vapor-solid phase treatment was conducted at 160° C. for 5 and 7 days. The resulting product was removed, washed with distilled water and dried, and then calcined in air at 550° C. The XRD spectrogram showed that the products all were ZSM-5 zeolites, and the shaped zeolites had a crystal size of less than 500 nm.

Examples 20-21

10 g of sesbania powder and aluminum sulfate solution (formed by dissolving 109 g of $Al_2(SO_4)_3 \cdot 18H_2O$ in 140 g of water) and 40 g of the seed crystal orienting agent prepared in Example 1 were added to 180 g of silica aerogel. Then, 200 g of water glass (wherein silicon dioxide was in an amount of 30 wt %; and $Na_2O$ was in an amount of 7.0 wt %) was added therein to knead the mixture.

The reaction vessel was pre-added with a mixture of 35 g of ethylenediamine and 5 g of distilled water. 150 g of the cylindrical product prepared above was placed above a stainless steel screen in the reaction vessel. After sealing of the reaction vessel, the vapor-solid phase treatment was conducted at 160° C. for 4 and 6 days. The resulting product was washed with distilled water and dried, and then calcined in air at 550° C. The XRD spectrogram showed that the products all were ZSM-5 zeolites, and the shaped zeolites had a crystal size of less than 500 nm.

Comparative Examples 1-3

80 g of silica sol 40 wt %) was added to 300 g of diatomite to obtain a mixture. Then, a suitable amount of water was added therein to knead the mixture.

The reaction vessel was pre-added with a mixture of 4 g of triethylamine, 5 g of ethylenediamine and 4 g of distilled water. 30 g of the cylindrical product prepared above was placed above a stainless steel screen in the reaction vessel. After sealing of the reaction vessel, the vapor-solid phase treatment was conducted at 180° C. for 3, 5 and 7 days. The resulting product was removed, washed with distilled water and dried, and then calcined in air at 550° C. The XRD spectrogram showed that no ZSM-5 zeolite crystals were produced, which indicated that the seed crystal orienting agent had an essential induction effect in the process of the present invention.

What is claimed is:

1. A process for producing a binder-free homogeneously crystallized and shaped ZSM-5 zeolite crystals comprising:
    mixing, by a one-off way, diatomite or carbon white as a silica source, oxides of aluminum, aluminium salts or aluminates as an aluminum source, a seed crystal orienting agent, and an extrusion aid together with a silica sol or water glass in a desired amount for kneading and shaping to obtain the precursor mixture having a weight ratio of $XNa_2O:Y Al_2O_3:100 SiO_2$ in which X is from 0 to 16, and Y is from 0 to 6,
    then converting to binder-free ZSM-5 shaped zeolites with a crystal size of less than 1 μm by vapor-solid phase crystallization with organic amine and water vapor, wherein the crystallization is conducted at 120-200° C. for 48-240 hours, said seed crystal orienting agent being obtained by aging the mixture having a molar ratio of $(TPA)_2O:2-10\ SiO_2:60-150\ H_2O$ at 50-100° C. for 12-240 hours, wherein TPA represents tetrapropylammonium;
    wherein the organic amine is selected at least one from the group consisting of ethylamine, n-propylamine, n-butylamine, ethylenediamine, triethylamine and hexanediamine; and
    wherein the extrusion aid is at least one selected from the group consisting of sesbania powder, starch, activated carbon, polyethylene glycol, polyacrylamide and polyvinyl alcohol, and is in an amount of 0.1-4 wt % of the precursor mixture.

2. The process according to claim 1, characterized in that the seed crystal orienting agent is added in an amount of 1.0-50 wt % of the precursor mixture.

3. The process according to claim 1, characterized in that the vapor-solid phase crystallization is conducted at 140-180° C.

4. The process according to claim 1, characterized in that the vapor-solid phase crystallization lasts 72-180 hours.

* * * * *